United States Patent [19]

Englund et al.

[11] 3,748,483

[45] July 24, 1973

[54] INDICATING DEVICE FOR USE IN OPTICAL DATA SENSING EQUIPMENT

[75] Inventors: Gosta R. Englund, Stockholm; Rune L. Myren, Spanga, both of Sweden

[73] Assignee: Svenska Dataregister AB, Solna, Sweden

[22] Filed: Dec. 14, 1971

[21] Appl. No.: 207,885

[30] Foreign Application Priority Data

Dec. 17, 1970 Sweden ............................ 17101/70

[52] U.S. Cl. ........................ 250/219 D, 235/61.11 E

[51] Int. Cl. ........................................... G01n 21/30

[58] Field of Search ................. 250/219 D, 219 DD, 250/219 DC; 235/61.11 E

[56] References Cited

UNITED STATES PATENTS

| | | | |
|---|---|---|---|
| 3,413,447 | 11/1968 | La Mers | 250/219 D |
| 3,474,234 | 10/1969 | Rieger | 250/219 D |
| 3,418,456 | 12/1968 | Hamisch | 250/219 DC |
| 3,585,366 | 6/1971 | Kern | 250/219 DD |
| 3,456,117 | 7/1969 | Ritzert | 250/219 DC |
| 3,334,236 | 8/1967 | Bacon | 235/61.11 E |
| 3,509,354 | 4/1970 | Reilly | 250/219 D |
| 3,509,353 | 4/1970 | Sunblad | 250/227 |

*Primary Examiner*—James W. Lawrence
*Assistant Examiner*—D. C. Nelms
*Attorney*—Norman Friedman, Leonard R. Fellen et al.

[57] ABSTRACT

Within the housing of a handheld optical reader lamps are arranged for producing a light spot on a document bearing readable information indicia. The light produced by the lamps is fed to a light spot opening in the housing of the reader. An indicating means in the housing is provided by apertures which serve to transmit a small part of the light produced by the lamps. Via a control device the light is switched off each time a specific indicia is found on the document. The light is not switched on until a data processing unit, e.g. a cash register, is ready for receiving new data.

2 Claims, 3 Drawing Figures

INDICATING DEVICE FOR USE IN OPTICAL DATA SENSING EQUIPMENT

The present invention refers to an indicating device for use in optical data sensing equipment.

It is important in connection with data processing to know the mode of operation for units used. Thus, when data is to be supplied to a data processing device it is important to know if the device is ready for receiving data. Some kind of input device, e.g. an optical sign- or character reader, punched tape- or card reader or any similar device is often used for data processing. For avoiding incorrect input of data it is of great importance for an operator to receive a signal indicating whether the device is ready for use or not. If such a signal is not received this indicates that the data processing system is in a mode of operation which makes accepting of additional data impossible.

Whether an acceptance of data is possible or not is in indicating devices of the prior art indicated by means of any separate indicator device indicating the mode of operation. With an arrangement of this kind it is thus possible to receive an indication whether a data processing device is ready or not ready for receiving data. It is, however, not possible by means of indicating devices of this kind to ascertain that data is not sensed when the data receiving unit is in a mode of operation during which data cannot be accepted. For instance, it is possible for an operator, due to defects in the indicating device or an incorrect reading of the indicator, to read data from an information carrier by means of the reading device. Thus, the information sensed is lost if the data processing unit, connected to the reading device, is not in a data accepting mode.

Indicating devices of the prior art as used in optical character readers have been so designed that an indication of the modes of operation of connected units have been received via a separate device, for instance a light source or an audio frequency generator.

As has been mentioned previously, inconveniences with the devices of the prior art are that it is difficult to ascertain that no data is read when connected data processing devices are in a not-data accepting mode. Besides, the known devices referred to require separate indicator means, having a limited field of use for achieving the desired function. In addition, the possibilities for failure are increased. This disadvantage depends on the increased number of components. Additionally, the cost is of course increased when the number of components pertaining to a system increases.

One object of the present invention is to eliminate the disadvantages mentioned and in a simple way achieve a reliable indicating device which makes it impossible to read data on an information carrier if the data processing units connected to the reader device are in a non-data accepting mode of operation.

An embodiment of the invention will now be described in connection with the accompanying drawing wherein.

Figure 1:
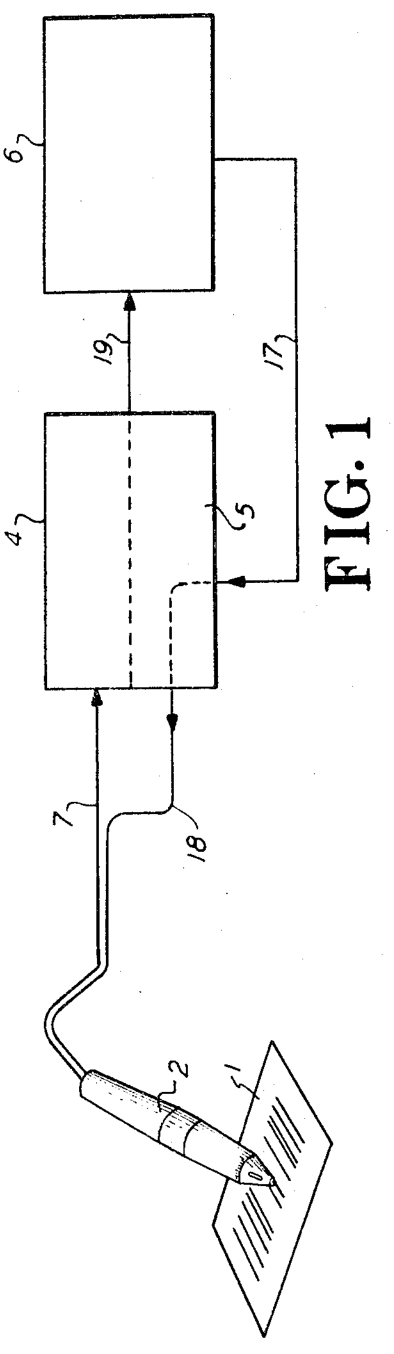
FIG. 1 shows a block diagram in accordance with the preferred embodiment.

The optical reader shown in FIG. 1 senses data on an information carrier 1 which, for instance, can be a label of the kind used in retail shops. The information can be in code form and/or directly recognizable. One type of code suitable for retail stores is a code consisting of non-reflecting bars on a reflecting background. The distances between the bars can have different values, for instance, a shorter one and a longer one. If two longer and three shorter distances are used for representing each character, ten different combinations, i.e. a number equal to the number of decimal digits, are achieved. Another type of suitable code is a code built up of longish fields of different reflectivity. If the code is made binary, possibilities are obtained for representing other characters than the decimal digits.

In the preferred embodiment of the invention the reader 2 includes a light source having three lamps 3, symmetrically arranged with respect to the centrum axis of the reading device. The lamps 3 are connected to a data processing unit 6 via a lamp controlling unit 5 forming a part of an electronic unit 4. The processing unit 6 can be a cash register for instance working as a terminal. The electronic control unit 4 includes, in addition to the lamp-control unit 5, decoding and drive circuits. The decoding circuits are used for identifying the input information being fed via the conductor 7 and are, according to the preferred embodiment, of the type described in Swedish Patent No. 327,107 and which corresponds to British Patent No. 1,252,528 and to U.S. patent application Ser. No. 205,428. As discussed in this application, decoding of the input information is accomplished by the principle of comparing a number of different time intervals between consecutive pulses of a pulse train. If, for instance, two time intervals are used, only five positions in which pulses may occur are sufficient for binary representation of the digits 0–9.

According to one decoding method as described in U.S. application Ser. No. 205,428, each pulse of the pulse train first causes a quantity stored in a first storage unit, the magnitude of which represents the time interval to the immediately preceding pulse in the pulse train, to be transferred to a number, corresponding to the number of different time intervals, of second storage units and then causes the first storage unit to be emptied, that subsequently the quantity stored in the first storage unit is permitted to linearly change its magnitude for measuring of the time interval to the immediately following pulse in the pulse train simultaneously as the quantity transferred to the second storage units is permitted to linearly change its magnitude, whereby when the shortest time interval appears, the transferred quantity is not permitted to change its magnitude sufficiently to activate identification circuits, of which each one is connected to one of the second storage units, the absence of an output from the identification circuits indicating the shortest of the intervals, whereas when a longer interval appears, the quantity stored in the second storage unit that, together with the connected identification circuit, shall identify this time interval is permitted to change its magnitude sufficiently to activate the identification circuit to thereby produce an output indicating this time interval.

Figure 2:
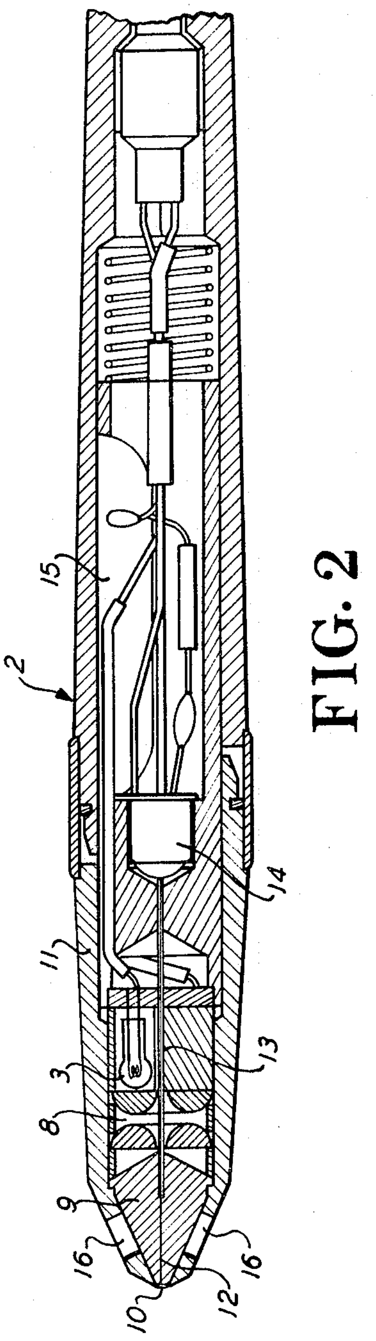
FIG. 2 shows a pen-shaped optical data sensing device.
Figure 3:
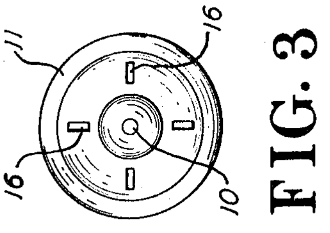
FIG. 3 shows a front view of the device shown in FIG. 2.

The decoding apparatus as described, for example, in said U.S. application Ser. No. 205,428 comprises a first storage unit connected to a source which supplies a quantity, the magnitude of which is linearly changed between consecutive pulses in the pulse train, a number, corresponding to the number of different time intervals, of second storage units connected to further sources which supply quantities of the same type as the source, the magnitudes of the quantities are linearly changed between consecutive pulses in the pulse train, each one of the second storage units being connected to the first storage unit by a switch, the switches being operated by each pulse in the pulse train in such a manner, that the quantity stored in the first storage unit is transferred to the second storage units and then the first storage unit is operated by the same pulses to be reset, the second storage means being so dimensioned that when the shortest time interval appears, the quantity stored in the second storage units will not change its magnitude to a reference value, a respective identification circuit connected to each second storage unit such that when a longer time interval appears, the second storage unit, indicating this interval, will change its stored magnitude to said reference value, whereby an output signal will be produced by the identification circuit connected to said second storage unit. If the data processing unit 6 is a cash register the drive circuit can be of the type shown in Swedish Patent application No. 15,880/69, which corresponds to United States Patent application Ser. No. 87,724. The sensing device described in detail in U.S. Pat. No. 3,509,353 includes, in addition to the lamps 3, a lens system 8 and a transparent body 9 of concical shape being optically connected to an end part 10 extending through an opening in the casing 11 for achieving a suitable light spot on the information carrier 1. For instance, the portion 10 can be a ruby. The re-emitted light from the information carrier 1 is catched by a light conductor 12 placed within the transparent body 9. The light conductor 12 consists of one or several optical fibres. At the upper part of the transparent body 9 the light conductor 12 is enclosed within a metal pipe 13 which together with the light conductor 12 is connected to a photo detecting device 14 which in the present embodiment is a silicon detector. In the central part 15 of the sensing device 2, electronic circuits are arranged for obtaining a suitable signal level on the conductor 7. The circuits can, as is shown in FIG. 2, be built up of discreet components or can be replaced by one single integrated circuit. In the front part of the casing 11 four light transmitting apertures 16 are symmetrically arranged making it possible for an operator to get an indication whether the lamps 3 are on or not, independently of the orientation of the reader 2.

The device works in the following manner. When the reader 2 is moved across the label 1, the light source 3 transmits light and via the apertures 16 an indication is received indicating that the data processing unit 6 is ready for receiving information. When a code mark on the information carrier 1 is found data is fed via the electronic unit 4 to the data processing unit 6. This proceeds until an end mark of the sensed coded information is found. When this occurs the lamps are switched off. The electrical circuits that are used for obtaining this form a part of the electronic unit 4 and can be designed in several ways, and as they per se do not form any part of the present invention they will not be further described. When the lamps 3 thus are switched off it is impossible for the operator to read data because the lamps 3 have the double function of first generating a light spot on the information carrier, and second giving the operator an indication, via the apertures 16, of the mode of operation of the data processing unit 6. During the time period the lamps 3 are switched off in the present embodiment, an output of data from the electronic unit 4 to the data processing unit 6 takes place. If the unit 6 is a mechanical cash register its longer time constant compared with the shorter time constant of the electronic unit 4, will be adapted to the system in such a way that when the cash register is in its "home-position" a signal is coupled to the lamp controlling control unit 5, via a conductor 17, this signal resulting in the lamps 3 being supplied with a voltage, via a conductor 18, for being switched on again. Hereby, the operator receives an indication via the apertures 16 that the data processing unit 6 is ready for receiving data via a conductor 19. Because the lamps 3 produce a light spot necessary for reading, it is possible to perform a reading operation.

It will be understood that the shape and positioning of the apertures can be different from what is shown in the figures, or that they can be eliminated, and an indication whether the lamps 3 are on or not be received through inspection of the portion 10 which is visual for the operator and illuminated when the data processing unit is in a data accepting mode.

What is claimed is:

1. In a data processing system of the type including a data utilization unit and wherein an optical reader device is provided to scan an information carrier and provide a corresponding data signal output to the data utilization unit, the improvement comprising:

means including a light source housed in said optical reader and providing a source of illumination for the operation of said optical reader in transducing the information stored on said information carrier;

means providing a control signal indication that said data utilization unit is ready to receive a data signal;

light control circuit means responsive to said control signal for effecting illumination of said light source to provide for data transduction from said information carrier, said control circuit means being further responsive to an end of data signal sensed from said information carrier to provide for the shut off of the illumination of said light source;

said optical reader having a casing including a plurality of light transmitting areas disposed therein and in communication with said light source so as to provide a visual indication of the illumination state of said light source.

2. A data processing system as set forth in claim 1 wherein one end portion of said casing is cone shaped and said light transmitting areas comprise a plurality of apertures symmetrically disposed in the surface of said cone shaped portion.

* * * * *